(12) United States Patent
Madhvanath et al.

(10) Patent No.: US 8,700,911 B2
(45) Date of Patent: Apr. 15, 2014

(54) AUTHENTICATION SYSTEM AND METHOD

(75) Inventors: Sriganesh Madhvanath, Bangalore Karnataka (IN); Naveen Sundar Govindarajulu, Coimbatore Tamil Nadu (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1381 days.

(21) Appl. No.: 12/030,216

(22) Filed: Feb. 13, 2008

(65) Prior Publication Data
US 2009/0138725 A1 May 28, 2009

(30) Foreign Application Priority Data
Nov. 28, 2007 (IN) .......................... 2788/CHE/2007

(51) Int. Cl.
*G06F 21/00* (2013.01)

(52) U.S. Cl.
USPC ............................................. 713/186; 726/28

(58) Field of Classification Search
USPC .......................................... 713/186; 382/124
See application file for complete search history.

(56) References Cited

U.S. PATENT DOCUMENTS

| | | | |
|---|---|---|---|
| 5,774,571 A | 6/1998 | Marshall | |
| 6,298,147 B1 | 10/2001 | Ilan | |
| 6,728,881 B1 * | 4/2004 | Karamchetty | ................ 713/186 |
| 6,941,001 B1 | 9/2005 | Bolle et al. | |
| 7,013,030 B2 | 3/2006 | Wong et al. | |
| 7,082,214 B2 | 7/2006 | Nakano et al. | |
| 7,116,805 B2 | 10/2006 | Machida | |
| 7,689,006 B2 | 3/2010 | Govindaraju et al. | |
| 2007/0080955 A1 * | 4/2007 | Cohen et al. | ................... 345/179 |
| 2007/0253608 A1 * | 11/2007 | Tulyakov et al. | ............. 382/125 |
| 2009/0175506 A1 * | 7/2009 | Polcha et al. | ................... 382/116 |
| 2009/0224874 A1 * | 9/2009 | Dewar et al. | ................. 340/5.53 |
| 2010/0225443 A1 | 9/2010 | Bayram et al. | |
| 2011/0032074 A1 | 2/2011 | Novack et al. | |

FOREIGN PATENT DOCUMENTS

| | | |
|---|---|---|
| JP | 2000048208 A | 2/2000 |
| JP | 2004258704 A | 9/2004 |

OTHER PUBLICATIONS

Ron Poet; A Mechanism for Filtering Distractors for Graphical Passwords; Year:2007; pp. 1-4.*
Nalini K. Ratha et al., Generating Cancelable Fingerprint Templates, IEEE Transactions on Pattern Analysis and Machine Intelligence, Apr. 2007, p. 561-572, vol. 29.
Faisal Farooq et al., Anonymous and Revocable Fingerprint Recognition, Entire document.

* cited by examiner

*Primary Examiner* — Mohammad W Reza
*Assistant Examiner* — Monjour Rahim

(57) ABSTRACT

An authentication system comprises a sensor for detecting a fingerprint and a doodle drawn by the user. The fingerprint, or other biometric information, is distorted in accordance with the doodle to provide distorted biometric information that is referred to as a doodleprint. The user can use different doodles on different systems, and if the doodleprint is compromised, can change the doodle to create a different doodleprint.

19 Claims, 5 Drawing Sheets

Curvature maxima

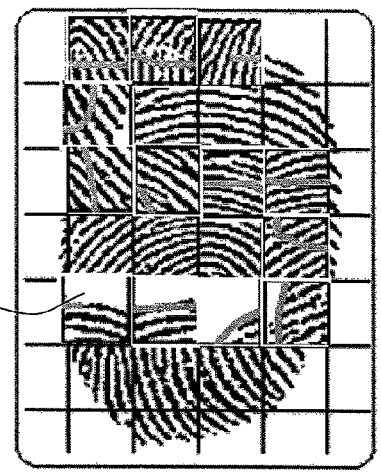
Figure 7a         Figure 7b
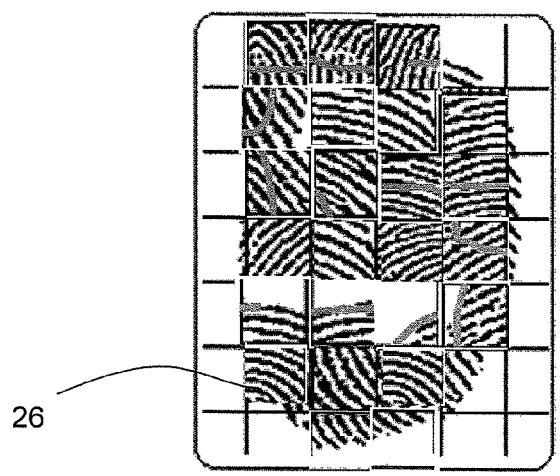
Figure 7c

AUTHENTICATION SYSTEM AND METHOD

RELATED APPLICATIONS

Benefit is claimed under 35 U.S.C. 119(a)-(d) to Foreign application Ser. 2788/CHE/2007 entitled "AUTHENTICATION SYSTEM AND METHOD" by Hewlett-Packard Development Company, L.P, filed on 28 Nov. 2007, which is herein incorporated in its entirety by reference for all purposes

BACKGROUND

With the increasing use of biometric systems for identity verification, privacy concerns have also risen amongst users. In a biometric system, such as a fingerprint verification system, information about some physical or behavioural characteristic of a person is stored and used to authenticate that person. The person is not in control of how the information is used. Current biometric systems also have limitations, in that the biometric information is typically unique and unchangeable, so that a user, using the information as a password, cannot have different passwords for different systems, and cannot change the password. This limitation also means once biometric information is lost or stolen it cannot be replaced with new biometric information. The user is also powerless to prevent cross-matching, namely the use of information collected for one system to access other systems or to discover all of the systems/applications being used by a particular individual.

Furthermore, if the system is breached, then the biometric information becomes publicly available and cannot be used again. In this scenario, once the biometric information becomes compromised, all the systems that use it also become vulnerable.

The present invention aims to address the above problem.

BRIEF DESCRIPTION OF THE DRAWINGS

Embodiments of the invention will now be described, by way of example, with reference to the accompanying drawings, in which:

FIGS. 7a to 7c illustrate the use of a modified Cartesian based approach to distort biometric information.

DETAILED DESCRIPTION

Embodiments of the present invention relate to a biometric system that uses a biometric characteristic of a user combined with a path traced by the user's finger to form authentication information that is referred to herein as a doodleprint. Particularly but not exclusively, the characteristic may be a user's fingerprint.

Figure 1:
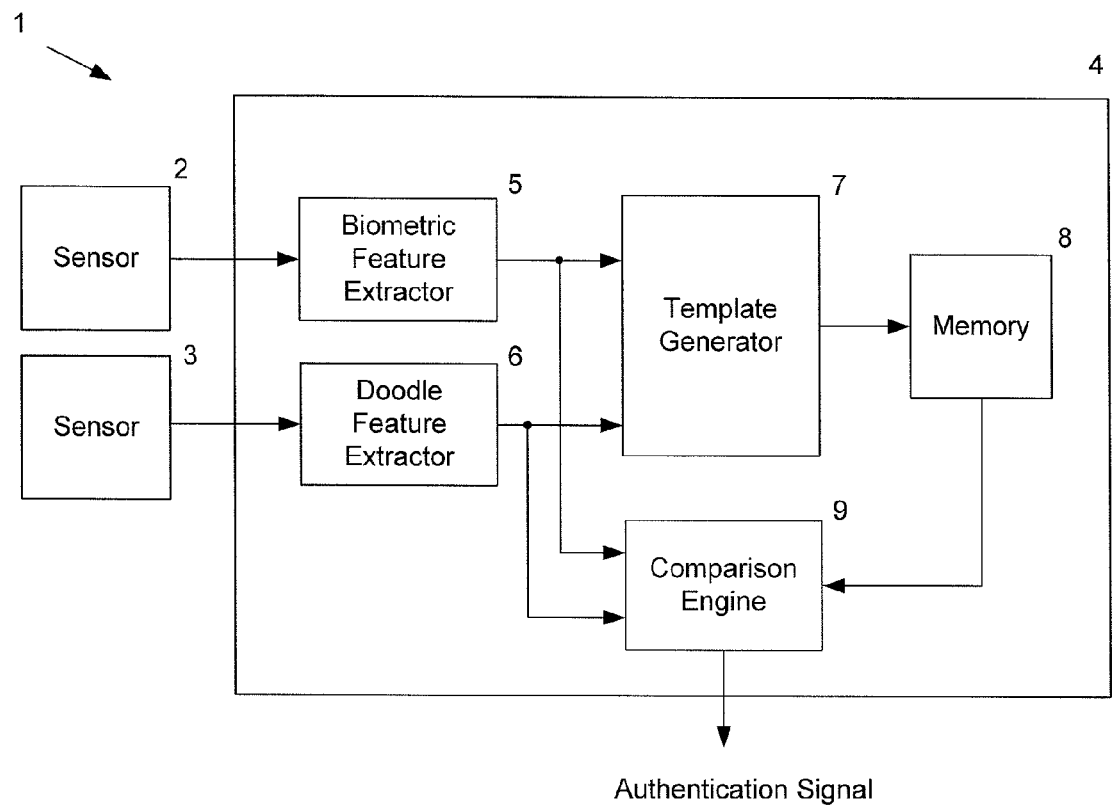
FIG. 1 illustrates a system according to an embodiment of the invention for capturing, creating and comparing authentication information in the form of doodleprints.

Referring to FIG. 1, an authentication system 1 according to an embodiment of the invention comprises first and second sensors 2, 3 and a processor 4. The first sensor 2 is for sensing the physical or behavioural characteristic of the user to be used as a biometric, while the second sensor 3 is for capturing the doodle traced by the user's finger. The processor 4 comprises a first feature extractor 5 for extracting a feature set representing the characteristic, and a second feature extractor 6 for extracting features of the path traced by the user's finger. A template generator 7 receives the extracted feature set from the first feature extractor 5 and the extracted feature set from the second feature extractor 6 and combines the information in a predetermined way to form authentication information, as will be explained in more detail below. A memory 8 stores the template. A comparison engine 9 is used to compare authentication information entered during an authentication routine against a stored template, for example using a conventional fingerprint matching algorithm to compare doodleprints. An authentication signal provided by the authentication system 1 can be, for example, either a single bit yes/no signal or can comprise more complex data involving cryptographic keys.

The first sensor 2 comprises any device that is capable of capturing a desired physical or behavioural characteristic, for example, but not limited to, a fingerprint scanner, a facial scanner, a retinal scanner and a voice print analyser. Many such devices are known and used in conventional authentication systems. The second sensor 3 is any device that is capable of recording a path traced by the user's finger moving over the sensor, for example a touch pad as is used in conventional notebook computers.

Figure 2:
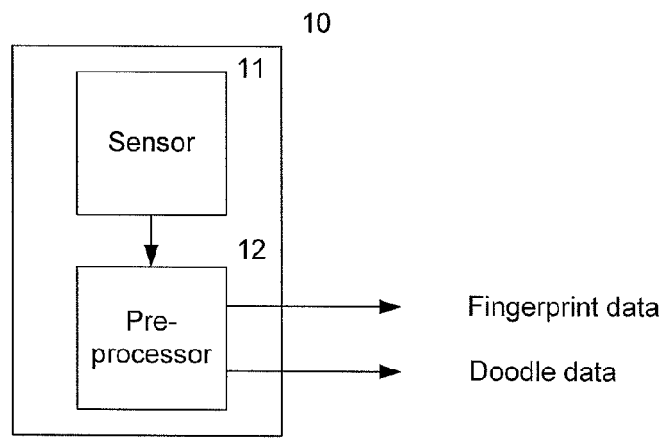
FIG. 2 illustrates a sensor assembly according to an embodiment of the invention comprising a single sensor for capturing a user's fingerprint and a doodle drawn by the user.

In the specific example of a system using a fingerprint as the desired characteristic, a sensor system 10 can be used in which a single sensor 11 replaces the first and second sensors 2, 3, as illustrated in FIG. 2. The single sensor 11 is capable of both capturing the fingerprint and determining the path traced by the user's finger. A pre-processor 12 receives the signal from the sensor 11 and produces separate fingerprint and doodle data for the processor 4 of FIG. 1. The sensor 11 may be capable of capturing the fingerprint of the user as the user is tracing the doodle, so that the act of acquisition of the fingerprint is combined with act of tracing or drawing the doodle.

For example, a capacitive touch sensor such as a notebook touch pad can be made more sensitive in order to detect fingerprint ridges. Such a sensor may then be used in two modes, first in a high resolution mode that allows capture of a fingerprint and then in a low resolution mode that allows capture of a path traced by the user's finger. In general terms, known optical and capacitive sensing technologies used for fingerprint capture can be modified to capture fingerprint trajectories. Contactless camera-based techniques for fingerprint and gesture tracking can also be integrated for use in the system of the invention.

As a further example, one way of realising sensor 11 is to make a conventional semiconductor based capacitive fingerprint sensor's surface large enough to allow a doodle to be traced on the surface of the sensor. When a finger comes into contact with the sensor, the sensor starts capturing images of the fingerprint at a rate determined by its sampling frequency. When the doodling process is over, the sensor would have acquired a series of fingerprint images captured at distinct time intervals.

The first image will correspond to the start of the doodling process and the last image will correspond to the end of the doodling process with the images in-between captured during the doodling process. The images can be then used to get the trajectory of the doodle. At any time the location of the finger can be obtained by computing the centroid of the fingerprint corresponding to that time. The series of centroid locations that are computed comprise the trajectory of the doodle.

Figure 3:
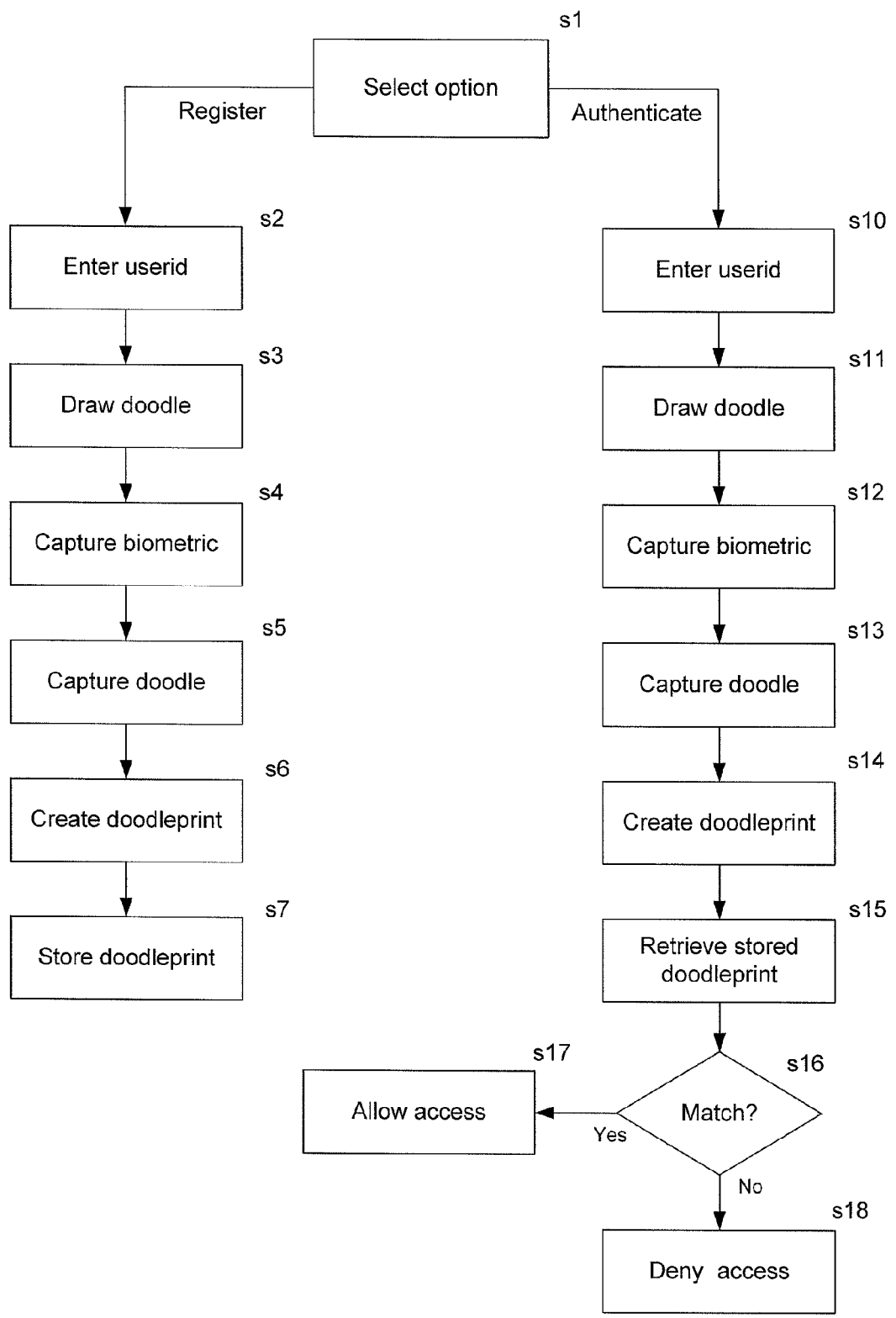
FIG. 3 is a flowchart illustrating a method of operating an authentication system according to an embodiment of the invention for capturing, creating and comparing authentication information in the form of doodleprints.

FIG. 3 illustrates a method of operating an authentication system according to an embodiment of the invention, for instance to give the user access to a restricted area, using the example of fingerprints as the biometric.

The user first selects either an enrollment/registration procedure to create authentication information for the first time, or an authentication procedure to verify the user's identity (step s1). It will be understood that the registration procedure will be carried out in such a way that only authorised users are enabled to set up authentication information.

If registration is requested, the system first requests a userid to be associated with the authentication information (step s2). The system then requests the user to draw a doodle on the touch pad (step s3). A doodle is any type of drawing, sketch or set of marks made by the user to form an overall shape or image that is easily memorable for the user. The user therefore draws the doodle on the sensor 2, 11. The system captures the user's fingerprint (step s4) and captures the path traced by the user's finger in forming the doodle (step s5). The system then combines the captured fingerprint with the captured path in a predetermined way to generate the authentication information, referred to herein as a doodleprint (step s6), and stores the doodleprint against the entered userid (step s7). The combining step is carried out by, for example, using a distortion function that is computed from the doodle, as will be described in more detail below. The distortion function is one method of realising a non invertible, or one-way, transform or function, such as a one-way hash function, on the fingerprint which:

1. makes it impossible or at least extremely difficult to compute the original fingerprint given the transformed (distorted) fingerprint;
2. allows the user to create different authentication profiles for the same biometric by using multiple more different transforms;
3. prevents cross-matching between biometric databases; and
4. produces different outputs for different input fingerprints.

When the user requires verification of previously entered authentication information, the user indicates this to the system by selecting an 'Authenticate' routine (step s1). The system requests a userid (step s10) and asks the user to draw a doodle on the touch pad 2, 11 (step s11). The system again captures the fingerprint and the doodle (steps s12, s13), and combines them in the predetermined way (step s14). It then retrieves the stored doodleprint for the entered userid (step s15) and compares the entered doodleprint with the stored doodleprint (step s16). If the doodleprints match to a predetermined confidence level, the user is given access to the secure system (step s17). If they do not match, the user is denied access (step s18).

While the above method has been described with reference to fingerprints as the basic biometric information, it will be understood that any biometric information could be used, which covers any form of physical or behavioural characteristic of a user. For example, in the case of face recognition, the user is asked to first present his face to a camera 2, and then to draw a doodle on a separate touch pad 3.

Figure 4:
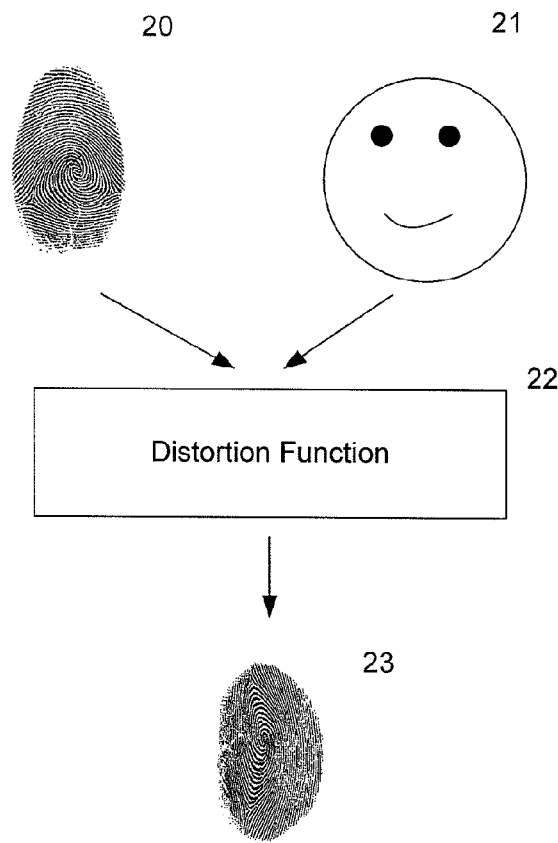
FIG. 4 is a schematic diagram illustrating the process of forming authentication information in the form of a doodleprint.

In forming the doodleprint 23, a one way function 22 can be used to transform or distort the original biometric information 20 according to the doodle 21, as schematically illustrated in FIG. 4.

Figure 5:
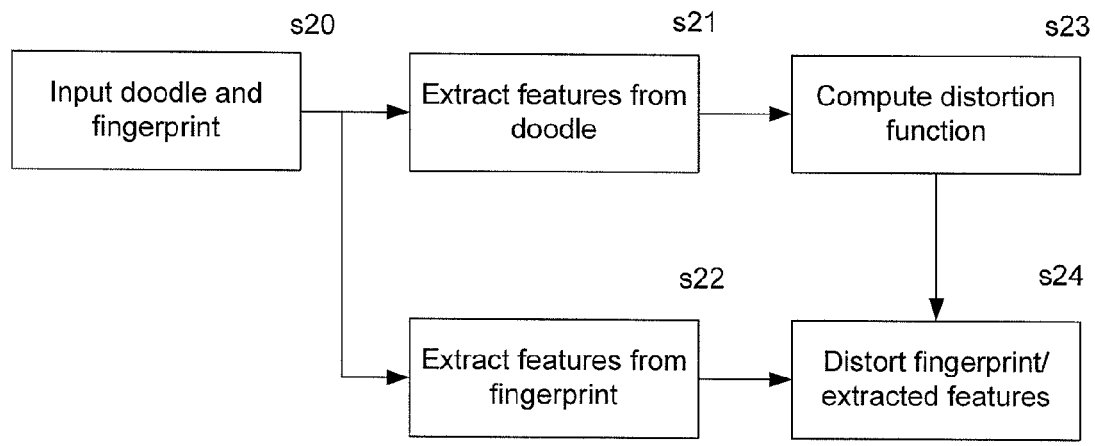
FIG. 5 is a flowchart illustrating the steps of forming the doodleprint in more detail.

The step of creating the doodleprint 23 shown in FIG. 3 as steps s6 and s14 is shown in more detail in FIG. 5.

The fingerprint and doodle are input from the sensors 2, 3, 11 into respective feature extractors 6, 7 (step s20). Features of the doodle and the fingerprint are extracted (steps s21, s22). The features extracted from the doodle can include the trajectory of the doodle (x,y,z coordinates), pressure exerted by the user on the doodling surface (if any), number and timing of any taps on the surface, points of maximum or minimum curvature along the trajectory of the doodle and so on.

A distortion function (one way function) is computed based on the doodle's features (step s23). The fingerprint features are then distorted using the distortion function to obtain the doodleprint (step s24). Referring again to FIG. 3, the resulting doodleprint is either stored (step s7) or compared with a previously stored doodleprint (step s16). Since neither the doodle, nor the original fingerprint is stored in its undistorted form, if the system is compromised, then only the doodleprint can be discovered.

In an alternative embodiment, the distortion function is applied to the entire fingerprint, rather than to features extracted from the fingerprint.

In a further alternative embodiment, the distortion function is computed once during enrolment/registration from the doodle and stored in a fuzzy cryptographic vault with the doodle as the key for the vault. The vault is stored along with the doodleprint. When the authentication routine (step s1) is invoked, the system unlocks the vault with the doodle to retrieve the distortion function and applies the function on the input fingerprint to generate a doodleprint. This doodleprint is then compared with the stored doodleprint.

A still further alternative embodiment using a fuzzy vault combines the doodle and the fingerprint to generate a cryptographic key. The doodle and the fingerprint are combined to form the composite key set of a fuzzy cryptographic vault. The vault here stores a secret which is protected by the doodle and fingerprint combination. The composite lock set is called a doodleprint. To unlock the vault to retrieve the secret, the doodleprint should be generated from the same finger and doodle. The doodleprint used to generate the key set can be the original fingerprint without any distortion combined with the doodle.

A number of different fingerprint distortion methods are known and can be applied to embodiments of the present invention. In preferred embodiments, the distorted fingerprint image should not match the original fingerprint image, it should be computationally difficult to recover the original image from the distorted image and doodleprints generated repeatedly from the same finger and the same doodle should match. Furthermore, a doodleprint should match with another doodleprint if and only if both the doodleprints are generated from the same fingerprint and the same doodle.

For example, the fingerprint image is divided into a grid or into sectors, and cells within the grid, or the sectors, are rearranged. Alternatively, the fingerprint minutiae positions are changed by adding a function of the form $F(x, y)$, which specifies the displacement of the minutiae at the point $(x, y)$.

In accordance with an embodiment of the invention, the distortion function is based on an adapted random charge distribution. A random charge distribution results when charges are selected and placed on a plane at random. The force exerted by the charge distribution at a point $(x,y)$ is given by the following equation:

$$\vec{F}(x,y) = \sum_{i=1}^{k} q_i \frac{(\vec{z}-\vec{z}_i)}{|\vec{z}-\vec{z}_i|^3}$$

$q_i$ is the magnitude of the charge i and $\vec{z}_{ii}$ is the location of the charge i and $\vec{z}$ is the position vector of denoting the point (x,y)

Equation 1 where k is the number of random charges. In this case, $\vec{F}$ represents the distortion to be applied at each point in the original fingerprint image. A point located at (x,y) in the fingerprint image is moved to a new location given by the (x',y') given by $$x'=x+Fx$$

$$y'=y+Fy$$

Fx and Fy are the components of the electric force $\vec{F}$ along the x and y directions.

Rather than generating the charge distribution randomly, the charge distribution is extracted from the doodle and the fingerprint distortion function is computed from the charge distribution.

Figure 6A:
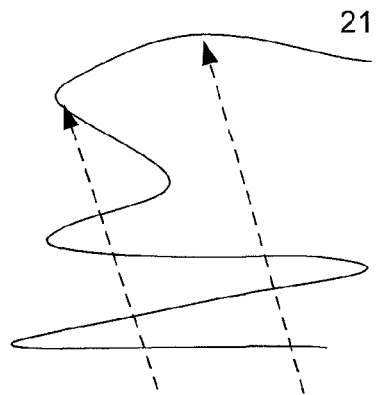
FIGS. 6a and 6b illustrate the use of a random charge based approach to compute a distortion function.
Figure 6B:
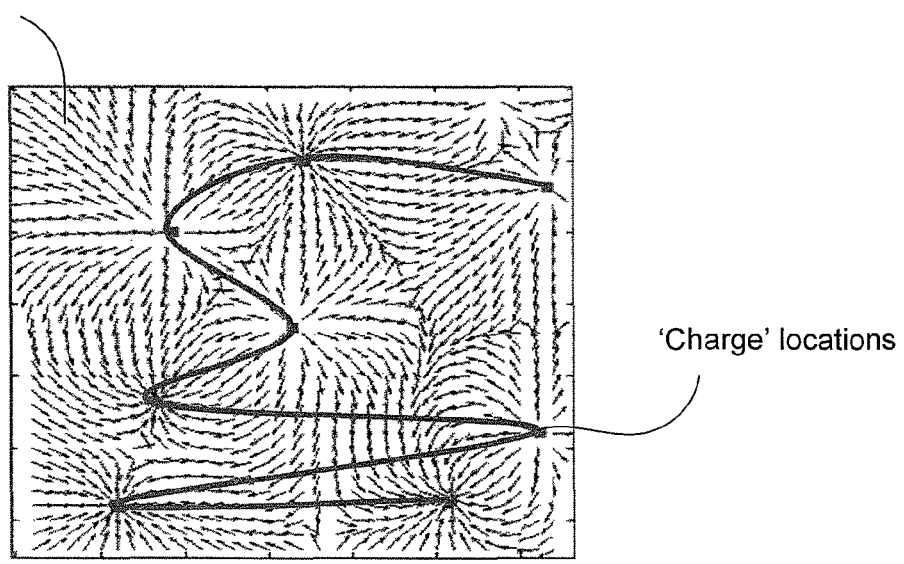

In more detail, the doodle is first scaled to fit the registered fingerprint image. The location of the 'charges' is then obtained from the curvature maxima of the doodle, as shown in FIG. 6a. The magnitude of the charge is set to be proportional to the magnitude of the curvature at the maxima. The resulting charge distribution, illustrated in FIG. 6b, is used to distort the fingerprint image in accordance with equation 1 above.

In a further embodiment, an adapted Cartesian (grid-based) distortion method is used. In this embodiment, the fingerprint image is first divided into a grid, as shown in FIG. 7a. The cells 25 over which the doodle 21 passes are reversed, or shown in FIG. 7b. The other cells 26 are rearranged in accordance with a conventional permutation algorithm as shown in FIG. 7c. For example, the cell at position x, y is moved to position x+a, y−b, where a and b are predetermined offsets. This method follows a many to one mapping in which more than one cell is mapped into a single cell. This condition is necessary to make the transformation difficult to invert.

In a still further embodiment, geometric features computed from the doodle are used as inputs to the distortion function, for example using Rubine's gesture recognition system, which determines features such as total gesture length, the cosine and the sine of the initial angle of the gesture and so on.

It will be understood by the skilled person that a variety of different distortion algorithms could be used to distort the biometric information in accordance with an entered doodle.

It will further be understood by the skilled person that the generated doodleprint could be used, not only with a userid, but also in combination with any form of password or pin or other security technique or could be used alone for authentication without any userid.

In still further alternative embodiments, the biometric information is transformed not by a doodle, but by any other form of user input, including for example a text string such as a password or PIN number, or any other form of input that can be changed at will by the user. In these embodiments a distortion function or other transform is computed from the text string or other input and used to distort the biometric. For example, the input text string can be passed through a cryptographic one way hash function. The ASCII values of the characters of the output of the cryptographic one way hash function are used to compute a distortion function. The values of the first half of the characters of the output string can be used to compute the magnitudes of the charges in a distribution.

The values of the characters of the second half of the output string can be use to compute the locations of the charges. Then the force exerted by this charge distribution can be used to distort an image of the biometric.

The component parts of the invention may be embodied in hardware or software, including software on a computer readable medium. For example, the feature extraction modules, template generator and comparison engine shown in FIG. 1, may be implemented in hardware or as one or more application programs running on a processor.

The inventiom claimed is:

1. A processor-implemented method of generating authentication information for a user, comprising:
receiving biometric information of the user by the processor;
receiving an input from the user by the processor, wherein the biometric information and the input are captured using at least one sensor, and wherein the input includes capturing by the at least one sensor a path traced by the user's finger while drawing a doodle on a surface of the at least one sensor;
combining the biometric information with the captured path to generate authentication information by the processor.

2. A method according to claim 1, wherein the input comprises at least one of a graphical image or a text string.

3. A method according to claim 1, wherein combining the biometric information with the captured path comprises distorting the biometric information in accordance with information relating to the doodle.

4. A method according to claim 1, wherein the biometric information comprises a fingerprint.

5. A method according to claim 1, wherein the biometric information comprises features extracted from a fingerprint.

6. A method according to claim 3, wherein the information relating to the doodle comprises features extracted from the doodle.

7. A method according to claim 3, further comprising storing the distorted biometric information.

8. A method according to claim 7, comprising retrieving previously stored biometric information and comparing the distorted biometric information with the retrieved distorted biometric information.

9. A method according to claim 3, wherein distorting the biometric information further comprises computing a distortion function based on the doodle information.

10. A method according to claim 9, comprising applying the distortion function to the biometric information.

11. A method according to 3, comprising computing a distortion function during an initial registration and storing the distortion function in a fuzzy cryptographic vault with the doodle as the key information.

12. A method according to claim 1, wherein the combination of the biometric information and the input comprises a cryptographic key set for a fuzzy cryptographic vault,
wherein the vault stores a secret protected by the combination.

13. An authentication system comprising:
at least one sensor to capture biometric information of a user and to capture an input from the user; and
a processor to:

receive the biometric information of the user from the at least one sensor;

receive the input from the at least one sensor, wherein the input includes capturing a path traced by the user's finger while drawing a doodle on a surface of the at least one sensor; and combine the biometric information with the captured path to generate authentication information.

14. An authentication system according to claim 13, wherein the input comprises text string.

15. An authentication system according to claim 13, wherein the processor is arranged to distort the biometric information in accordance with information relating to the doodle to generate the authentication information.

16. An authentication system according to claim 13, wherein the at least one sensor comprises:

a first sensor for receiving the biometric information; and a second sensor for receiving the doodle.

17. An authentication system according to claim 13, wherein the at least one sensor comprises a single sensor for sensing the biometric information and the doodle.

18. An authentication system according to claim 17, wherein the single sensor is arranged to capture the doodle drawn on the sensor by the user and to capture a fingerprint of the user while the doodle is being drawn.

19. An authentication system according to claim 15, wherein the distorted biometric information comprises a first doodleprint, further comprising:

a comparison engine for comparing the first doodleprint with a second doodleprint stored against the user.

* * * * *

UNITED STATES PATENT AND TRADEMARK OFFICE
CERTIFICATE OF CORRECTION

PATENT NO.        : 8,700,911 B2  
APPLICATION NO.   : 12/030216  
DATED             : April 15, 2014  
INVENTOR(S)       : Madhvanath et al.

Page 1 of 1

It is certified that error appears in the above-identified patent and that said Letters Patent is hereby corrected as shown below:

In the Claims

Column 6, line 55, Claim 11, delete "3," and insert -- claim 3, --, therefor.

Column 7, line 10, Claim 14, delete "text" and insert -- a text --, therefor.

Signed and Sealed this  
Seventh Day of October, 2014

Michelle K. Lee  
*Deputy Director of the United States Patent and Trademark Office*